United States Patent
Poletto et al.

(10) Patent No.: US 7,657,934 B2
(45) Date of Patent: Feb. 2, 2010

(54) ARCHITECTURE TO THWART DENIAL OF SERVICE ATTACKS

(75) Inventors: Massimiliano Antonio Poletto, Cambridge, MA (US); Anne Elizabeth Dudfield, Cambridge, MA (US)

(73) Assignee: Riverbed Technology, Inc., San Francisco, CA (US)

( * ) Notice: Subject to any disclaimer, the term of this patent is extended or adjusted under 35 U.S.C. 154(b) by 1733 days.

(21) Appl. No.: 10/066,252

(22) Filed: Jan. 31, 2002

(65) Prior Publication Data

US 2003/0145233 A1 Jul. 31, 2003

(51) Int. Cl.
*H04L 9/00* (2006.01)
(52) U.S. Cl. .................................................. 726/22
(58) Field of Classification Search ............. 713/201; 709/224; 726/23, 22
See application file for complete search history.

(56) References Cited

U.S. PATENT DOCUMENTS

| | | | |
|---|---|---|---|
| 6,088,804 A * | 7/2000 | Hill et al. | 726/25 |
| 6,119,236 A * | 9/2000 | Shipley | 726/22 |
| 6,321,338 B1 * | 11/2001 | Porras et al. | 726/25 |
| 6,735,702 B1 * | 5/2004 | Yavatkar et al. | 726/13 |
| 6,895,432 B2 * | 5/2005 | Ando et al. | 709/220 |
| 7,007,299 B2 * | 2/2006 | Ioele et al. | 726/14 |
| 7,162,737 B2 * | 1/2007 | Syvanne et al. | 726/12 |
| 2002/0069356 A1 * | 6/2002 | Kim | 713/160 |
| 2002/0078382 A1 * | 6/2002 | Sheikh et al. | 713/201 |
| 2002/0083343 A1 * | 6/2002 | Crosbie et al. | 713/201 |
| 2003/0084323 A1 * | 5/2003 | Gales | 713/200 |

OTHER PUBLICATIONS

Towards Trapping Wily Intruders In The Large, Mansfield et al, Sep. 1999.*

* cited by examiner

*Primary Examiner*—Andrew L Nalven
(74) *Attorney, Agent, or Firm*—Park, Vaughan & Fleming LLP (57) ABSTRACT

A monitoring device is disposed to thwart denial of service attacks on a data center. The monitoring device is a device that collects statistical information on packets that are sent between a network and the data center for a plurality of customers by examining traffic as if the device was disposed on links that are downstream from links that the provisioned monitor is disposed on.

32 Claims, 10 Drawing Sheets

ARCHITECTURE TO THWART DENIAL OF SERVICE ATTACKS

BACKGROUND

This invention relates to provisioned techniques to thwart network-related denial of service attacks.

In denial of service attacks, an attacker sends a large volume of malicious traffic to a victim, e.g., victim data center. In one approach an attacker, via a computer system connected to the Internet infiltrates one or a plurality of computers at various data centers. Often the attacker will access the Internet through an Internet Service Provider (ISP). The attacker by use of a malicious software program places the plurality of computers at the data centers under its control. When the attacker issues a command to the computers at the data centers, the machines send data out of the data centers at arbitrary times. These computers can simultaneously send large volumes of data over various times to the victim data center preventing the victim from responding to legitimate traffic.

SUMMARY

According to an aspect of the invention, a monitoring device is disposed for thwarting denial of service attacks on a data center. The monitoring device collects statistical information on packets that are sent between a network and the data center for a plurality of customers by examining traffic as if the device was disposed on links that are downstream from links that the provisioned monitor is disposed on.

According to an additional aspect of the invention, a method of thwarting denial of service attacks on a victim data center coupled to a network includes collecting statistical information on packets that are sent between a network and a plurality of customers of the data center by examining traffic as if the device was disposed on links that are downstream from links that the provisioned monitor is disposed on and communicating data, over a dedicated network, to a control center.

According to an aspect of the invention, an arrangement is disposed to monitor a link between a data center and a network for thwarting denial of service attacks on the data center. The arrangement includes a provisioned monitor that collects statistical information for a plurality of provisioned customers, which are on links that are downstream from links that the provisioned monitor is disposed on, the provisioned monitor maintaining separate counter logs for each provisioned customer and a global counter log that accounts for all traffic seen on the link that the provisioned monitor is coupled to.

According to an additional aspect of the invention, a method of thwarting denial of service attacks on a victim data center coupled to a network includes collecting statistical information for a plurality of provisioned customers on links that are downstream from links on which collecting occurs and maintaining separate counter logs for each provisioned customer, and a global counter log that accounts for all traffic seen on the links on which collecting occurs.

According to a still further aspect of the invention, a method of thwarting denial of service attacks on a victim data center coupled to a network includes collecting statistical information for a plurality of links that are downstream from links on which collecting occurs and performing traffic analysis on the collected statistical information on a per downstream link basis to identify malicious traffic. The method also includes communicating alerts that arise from the traffic analysis.

One or more aspects of the invention may provide one or all of the following advantages.

Aspects of the invention provide a provisioned monitoring architecture to detect and determine packets that are part of a denial of service attack and provide monitoring capabilities for hosted customers equivalent to placing physical monitors on those hosted customers' individual access links. More generally, provisioned monitoring provides monitoring capabilities for many smaller links by analyzing traffic on a larger upstream link. Provisioned monitoring can be extended to other, e.g., in-line provisioned services, such as "provisioned traffic engineering" or "provisioned fire walling".

The details of one or more embodiments of the invention are set forth in the accompanying drawings and the description below. Other features, objects, and advantages of the invention will be apparent from the description and drawings, and from the claims.

DETAILED DESCRIPTION

Figure 1:
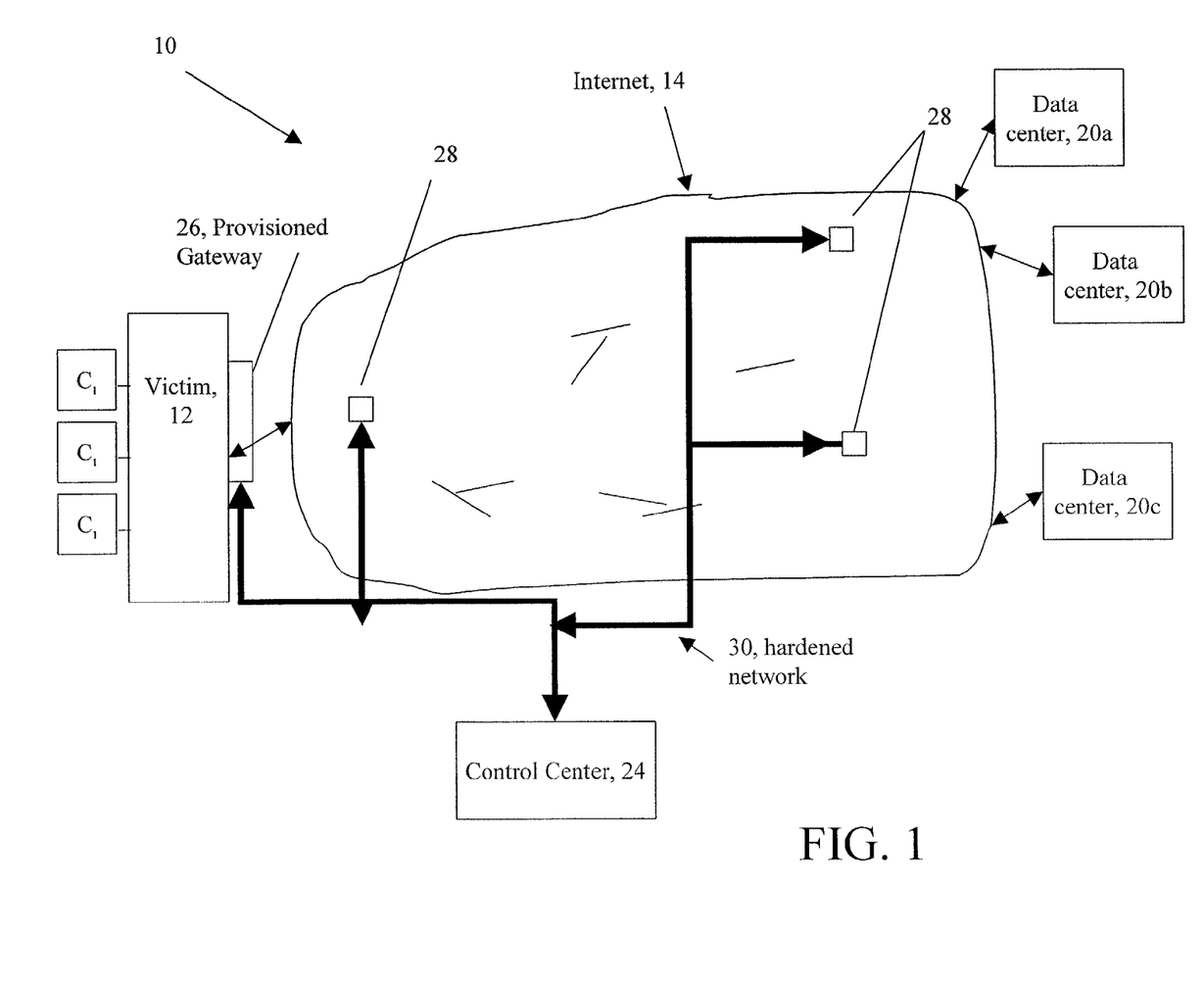
FIG. 1 is a block diagram of network having a provisioned architecture to thwart denial of service attacks

Referring to FIG. 1, an arrangement 10 to thwart denial of service attacks (DoS attacks) is shown. The arrangement 10 is used to thwart an attack on a victim data center 12, e.g., a web site or other network site under attack. The victim 12 is coupled to the Internet 14 or other network. For example, the victim 12 has a web server located at a data center (not shown).

An attacker via a computer system (not shown) that is connected to the Internet e.g., via an Internet Service Provider (ISP) (not shown) or other approach, infiltrates one or a plurality of computers at various other sites or data centers 20a-20c. The attacker by use of a malicious software program (not shown) that is generally surreptitiously loaded on the computers of the data centers 20a-20c, places the plurality of computers in the data centers 20a-20c under its control. When the attacker issues a command to the data centers 20a-20c, the data centers 20a-20c send data out at arbitrary times. These data centers 20a-20c can simultaneously send large volumes of data at various times to the victim 12 to prevent the victim 12 from responding to legitimate traffic.

The arrangement 10 to protect the victim includes a control center 24 that communicates with and controls monitor devices, e.g., gateways 26 and data collectors 28 disposed in the network 14. The arrangement protects against DoS attacks via intelligent traffic analysis and filtering that is distributed throughout the network. In some embodiments, the control center 24 is coupled to the gateways 26 and data collectors 28 by a hardened, redundant network 30. In preferred embodiments, the network is inaccessible to the attacker. The gateway 26 devices are located at the edges of the Internet 14, for instance, at the entry points of data centers. The gateway devices constantly analyze traffic, looking for congestion or traffic levels that indicate the onset of a DoS attack. The data collectors 28 are located inter alia at major peering points, data centers and network points of presence (PoPs). The data collectors 28 sample packet traffic, accumulate, and collect statistical information about network flows.

Some or all of the deployed monitor devices in the arrangement are provisioned monitors. Such provisioned monitors can include provisioned gateways and provisioned data collectors that are linked to the central control center 24. As shown in FIG. 1, the gateway 26 is a provisioned device and is hereinafter referred to as provisioned gateway 26. However, the data collectors 28 could also be provisioned devices. Further, the arrangement 10 could be comprised of provisioned and nonprovisioned devices.

The control center 24 aggregates traffic information and coordinates measures to track down and block the sources of an attack. In one embodiment, the arrangement uses a distributed analysis emphasizing the underlying characteristics of a DoS attack, i.e., congestion and slow server response, to produce a robust and comprehensive DoS solution. Thus, this architecture 10 can stop new attacks rather than some solutions that can only stop previously seen attacks. Furthermore, the distributed architecture 10 will frequently stop an attack near its source, before it uses bandwidth on the wider Internet 14 or congests access links to the targeted victim 12.

Figure 2:
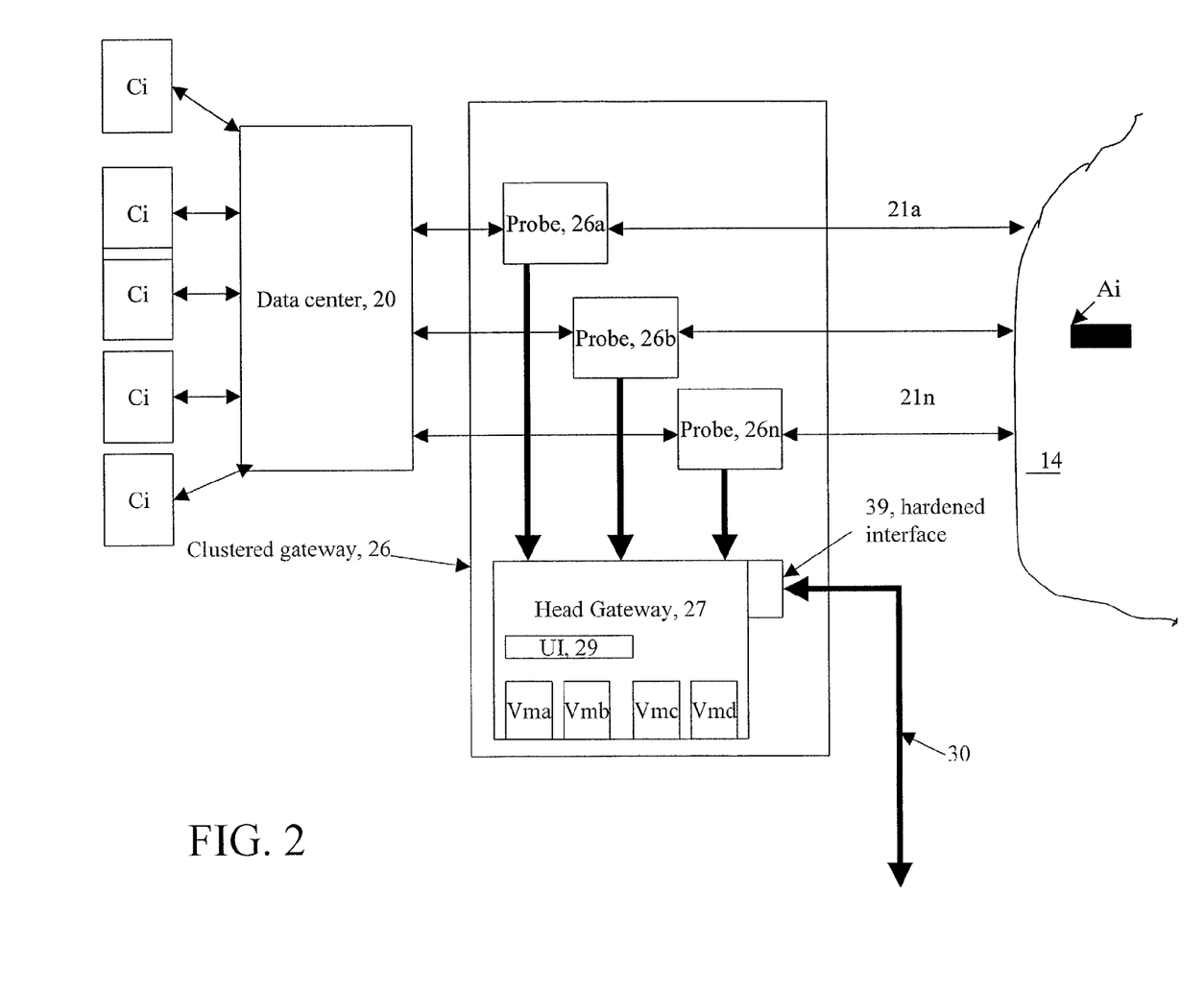
FIG. 2 is a block diagram depicting an architecture of a provisioned, clustered gateway.

The provisioned gateway 26 can be a single device, e.g. a data collector or gateway, or as described in FIG. 2 a clustered device that can monitor a plurality of links. One example of a clustered device is the clustered gateway 26. The clustered gateway is used to monitor a plurality of links that exist between the victim center 12 and the Internet 14. The provisioned, clustered gateway 26 is placed on selected links in the data center so that it examines all traffic entering or leaving that data center. The gateway 26 also examines all of the traffic to or from a particular data center customer ("hosted customer") or an individual host or group of hosts.

The provisioned monitor, e.g., gateway 26 logically analyzes traffic on a link or links so as to provide monitoring capabilities for hosted customers $C_1$ equivalent to what could be obtained by placing physical monitors on those hosted customers' individual access links. The provisioned gateway 26 provides monitoring capabilities for many smaller links in the data center by analyzing traffic on a larger upstream link.

Referring now to FIG. 2, the data center 20 has a plurality of links 21a-21n with the Internet 14. Each customer Ci ($0<=i<N$, for N customers) of the data center is associated with a set of addresses Ai. The provisioned monitor has a notion of inbound and outbound packets, obtained directly from the physical link's transmit and receive ports. Any inbound packet with a destination address in Ai is interpreted as inbound to customer Ci. Every outbound packet with a source address of Ai is interpreted as outbound from customer Ci. Inbound or outbound packets with other addresses (e.g., addresses that are not in the address space Ai for any customer i) are classified as "other". Inbound packets with unknown destination addresses may be destined to customers that have not been provisioned. Outbound packets with unknown source addresses may be coming from customers that have not been provisioned, or they may be part of a spoofing attack.

A service provider that provides a provisioned monitor 26 could perform ingress filtering on traffic entering its network from customers downstream of the provisioned monitor. In this way, any outbound packets with unknown source addresses (not in any address of address space Ai) are considered to be originating from unprovisioned customers rather than being part of a spoofed DoS attack.

The links exist through various network architectural arrangements, the details of which are not an important consideration here. The provisioned customers $C_i$'s of the data center 20 are protected by the clustered gateway 26. The clustered gateway 26 includes a plurality of probe devices 26a-26n, which are here shown coupled in-line with the links between the data center 20 and the Internet 14. The probe devices 26a-26n have connections to a head gateway device 27.

The cluster head device 27 likewise can have an optional and/or hardened redundant network interface connection to a hardened/redundant network 30. This interface is used to connect the head gateway device 27 to the control center 24 (FIG. 1) or to allow operator access to the cluster.

Probes 26a-26n perform several functions such as sampling of packets and collect information pertaining to statistical properties of the packets. In preferred embodiments, the probes 26a-26n examine every packet for statistical analysis purposes and randomly choose selected numbers of packets per second to pass to the cluster head 27. The cluster head 27 is responsible for receiving the sampled traffic packets and summary information provided from the probes 26a-26n. The cluster head 27 analyzes the traffic for detection of denial of service attacks using any known algorithms or the algorithms described below. The analysis is performed for each $C_i$'s traffic as well as for the entire link.

Each provisioned customer's virtual monitor e.g. virtual monitors $V_{ma}$, $V_{mb}$, $V_{mc}$ and $V_{md}$ for clients $C_a$-$C_d$, are configured with a set of thresholds and other parameters like those of a normal physical monitor. Customer $C_a$'s virtual monitor's heuristics are based on traffic that has been classified as being sent to or originating from customer $C_a$, as described above. Other customers have virtual monitor heuristics classified based on traffic for that customer.

The provisioned monitor also provides all the features of a standard monitor for the link on which the monitor is deployed. The provisioned monitor includes all of the analysis capabilities of a standard monitor deployed on the same link.

The cluster head 27 also provides a user interface 29 into the traffic analysis and also communicates with the control center 24. The provisioned gateway 26, configured for N customers provides N+2 user interfaces. These interfaces are one interface for each provisioned customer, one interface for the link(s) on which the monitor is physically deployed, and one "management interface." The customer and link interfaces are similar to those of a traditional physical monitor. The link interfaces provide the same data as a non-provisioned monitor in the same location. The management interface allows the hosting provider to oversee the status of all provisioned customers on one screen.

The cluster head 27 is connected to the probes 26a-26n. In one embodiment, a network type of connection provides connectivity between the cluster head 27 and probes 26a-26n. An exemplary type of network connection is a 100 Mbit Ethernet network. Other connections and other network configurations, of course, could be used. Preferably this connection is a private network used only for inter-cluster communications. As a probe 26a-26n starts up and joins the cluster, it obtains an IP address on the network and begins sending sample packets and statistical information to the cluster head 27 as will be described below.

The arrangement provides a straightforward manner to set up a cluster topology. The arrangement does not need a leader election protocol. Rather, a single cluster head 27 is used per cluster with all other probes as members. The cluster head 27 need not know explicitly about any particular cluster member. When a new cluster member is added to a cluster, the new cluster member can dynamically discover its cluster head and join the cluster. The cluster head will allow/deny the member to join the cluster. The cluster head will keep a minimal amount of information for each member of the cluster to facilitate debugging and analysis.

The links between cluster heads and members can be fast connections, e.g., 100 Mbs Ethernet. To achieve this a cluster member must be on the same IP network as the cluster head. In some embodiments, the DHCP protocol can be used whereas, in others a Cluster Discovery Protocol (CDP) described below can be used.

Figure 3:
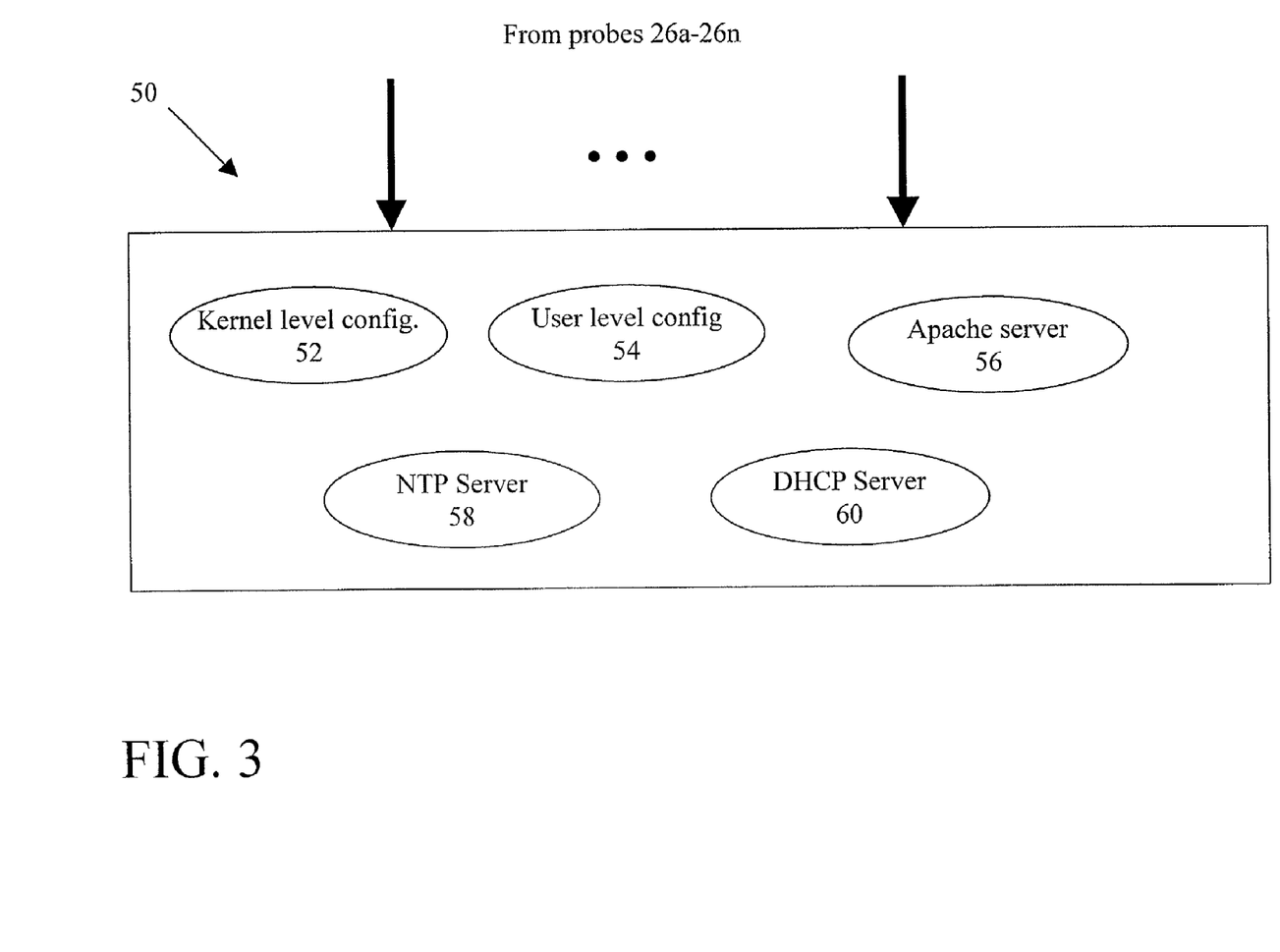
FIG. 3 is a block diagram depicting processes that execute on a gateway cluster head.

Referring now to FIG. 3, exemplary processes 50 that run on a cluster head 27 are shown. The cluster head 27 will include a server level configuration process 52 and a user level configuration process 54. The server level 52 configuration process in one implementation can be a Click server process, as described in the Appendix. The server level configuration process aggregates 52 traffic from various probes 26a-26n. The user-level configuration process 54 produces logs and runs detection algorithms. The cluster head 27 also includes a HTTP server or web server 56 such as an Apache server, as well as a time synchronization process such as NTP (network time protocol) 58. The cluster head 27 also includes a process 60 to allow the server to automatically assign an IP address to the probe. One example of such a process is the DHCP, e.g., dynamic host configuration protocol, which is a network protocol that enables an DHCP server to automatically assign an IP address to individual computers.

Figure 4:
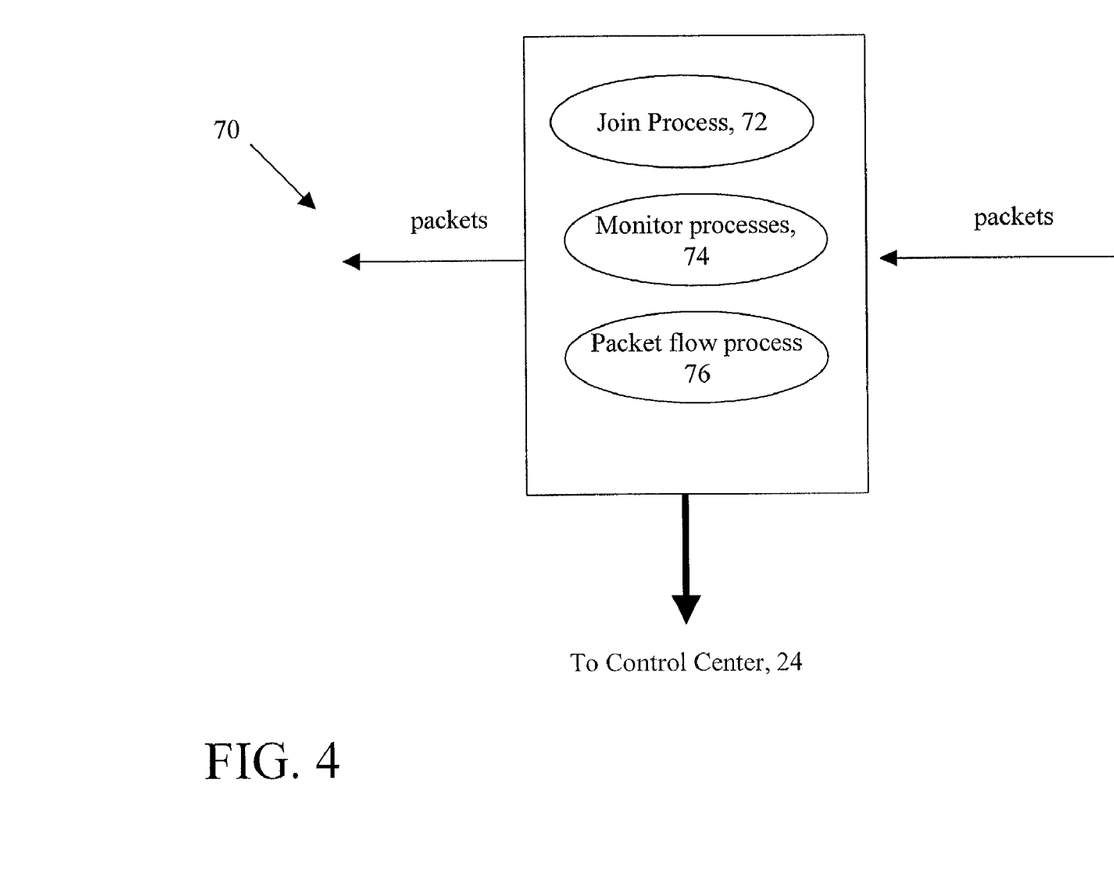
FIG. 4 is a block diagram depicting processes that execute on a probe.

Referring now to FIG. 4, exemplary processes 70 that execute on probe 26a are shown. The probe 26a executes a joining process 72 to permit the probe 26a to join an existing, operating cluster. The probe 26a also includes a monitor process 74 that monitors packets that pass through the probe 26a in an implementation where the probe 26a is disposed in-line between the data center and the Internet. The probe 26a also executes a packet flow process 76 that statistically samples random packets and sends those packets to the head server 27.

Figure 5:
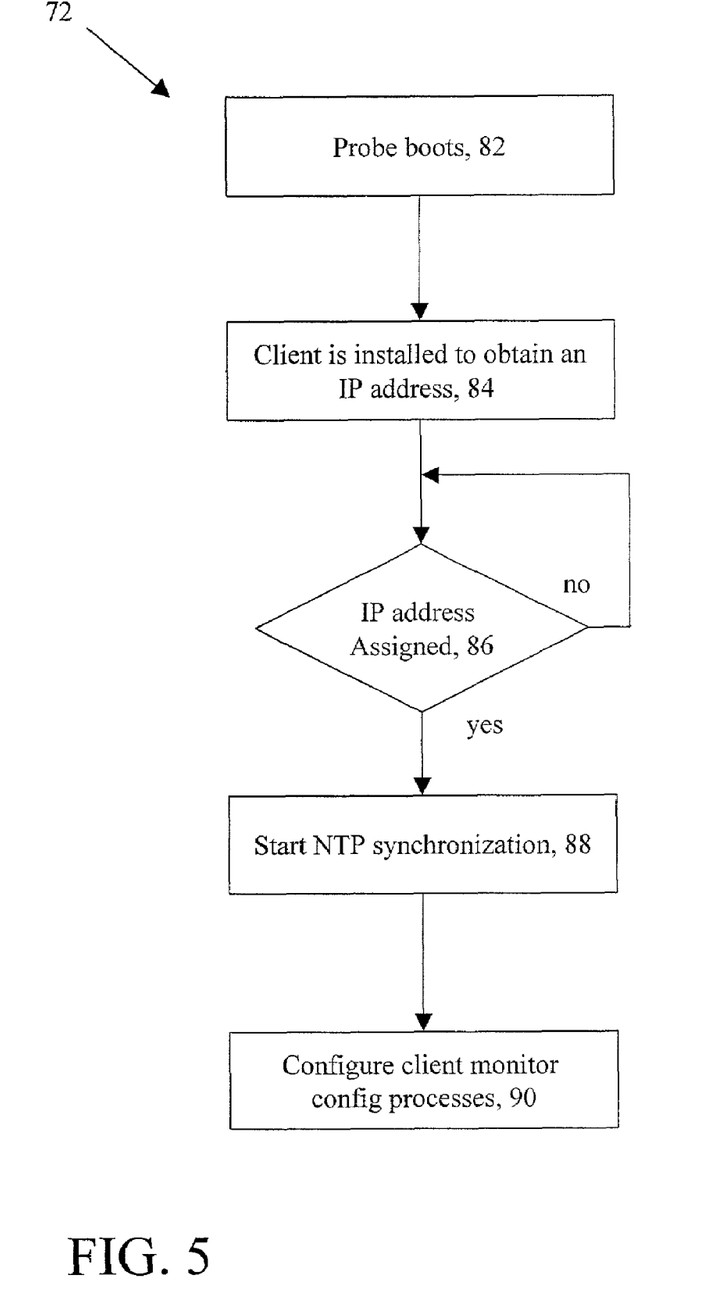
FIG. 5 is a flow chart depicting a joining process for a probe.

Referring to FIG. 5, the joining process 72 on the probes 26a-216n, is shown for probe 26a. During the joining process 72 the probe is booted 82. Once the probe boots, the probe executes a script. The script installs 84 kernel Click config (which is shown as 74 and 76 in FIG. 4), and runs a DHCP client application) to obtain a IP address from the cluster head. Once the IP address is assigned, the join process 72 will start 88 a NTP (Network Time Protocol, or equivalent) synchronization process between cluster head and probe to allow the probe to maintain the same time as other probes in the cluster, as well as the cluster head 27. After the NTP synchronization process 88, the process 72 configures 90 the monitor configuration in the Click kernel to enable the probe to collect statistical information concerning traffic flow to the probe, e.g., 26a, as well as to sample selected numbers of packets to send to the cluster head 27.

A probe can have a serial port for debugging/configuring that is accessed via the cluster network.

Figure 5A:
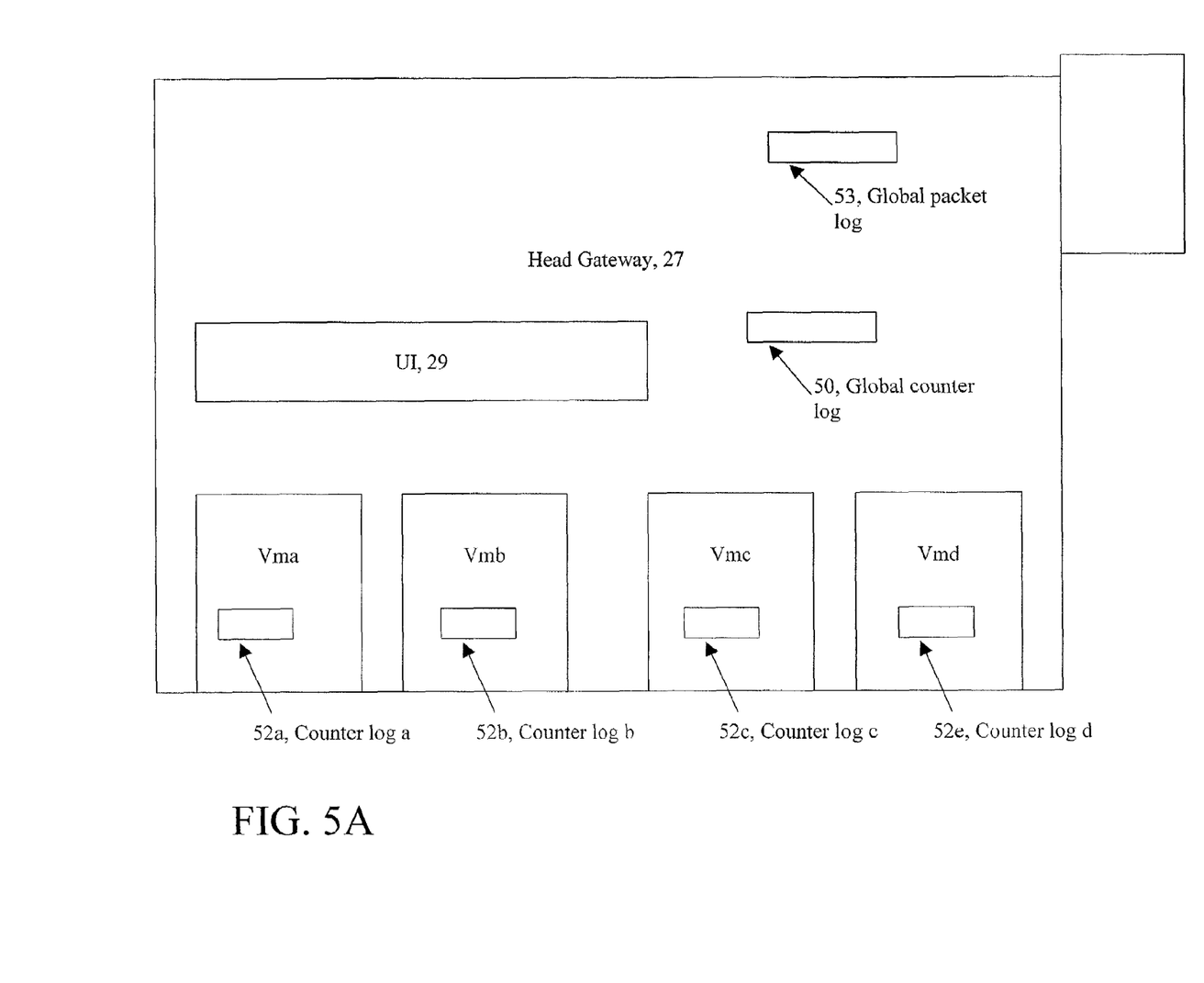
FIG. 5A is a block diagram depicting functional details of the provisioned gateway.

Referring to FIG. 5A, the provisioned gateway 26 stores both sampled packet logs, for detailed traffic analysis and forensic information, and counter logs (time series statistics about different kinds of traffic), for quick access to frequently needed data. Each provisioned monitor keeps separate counter logs 52a-52d for each provisioned customer (virtual monitor), as well as a global counter log 52 that accounts for all traffic seen on the link. In an alternate embodiment the clustered gateways keep one global packet log 53. The global packet log 53 includes a sample of all traffic seen on a link. Packet analysis for a particular virtual monitor happens by classifying packets based on addresses at the time of the analysis. Another embodiment (not shown) maintains duplicate packets, keeping both a global packet log and one log for each virtual monitor, potentially improving analysis speeds at the expense of more computation during data collection. This alternative may be less desirable because one can expect that analysis will happen infrequently relative to data collection.

Figure 6A:
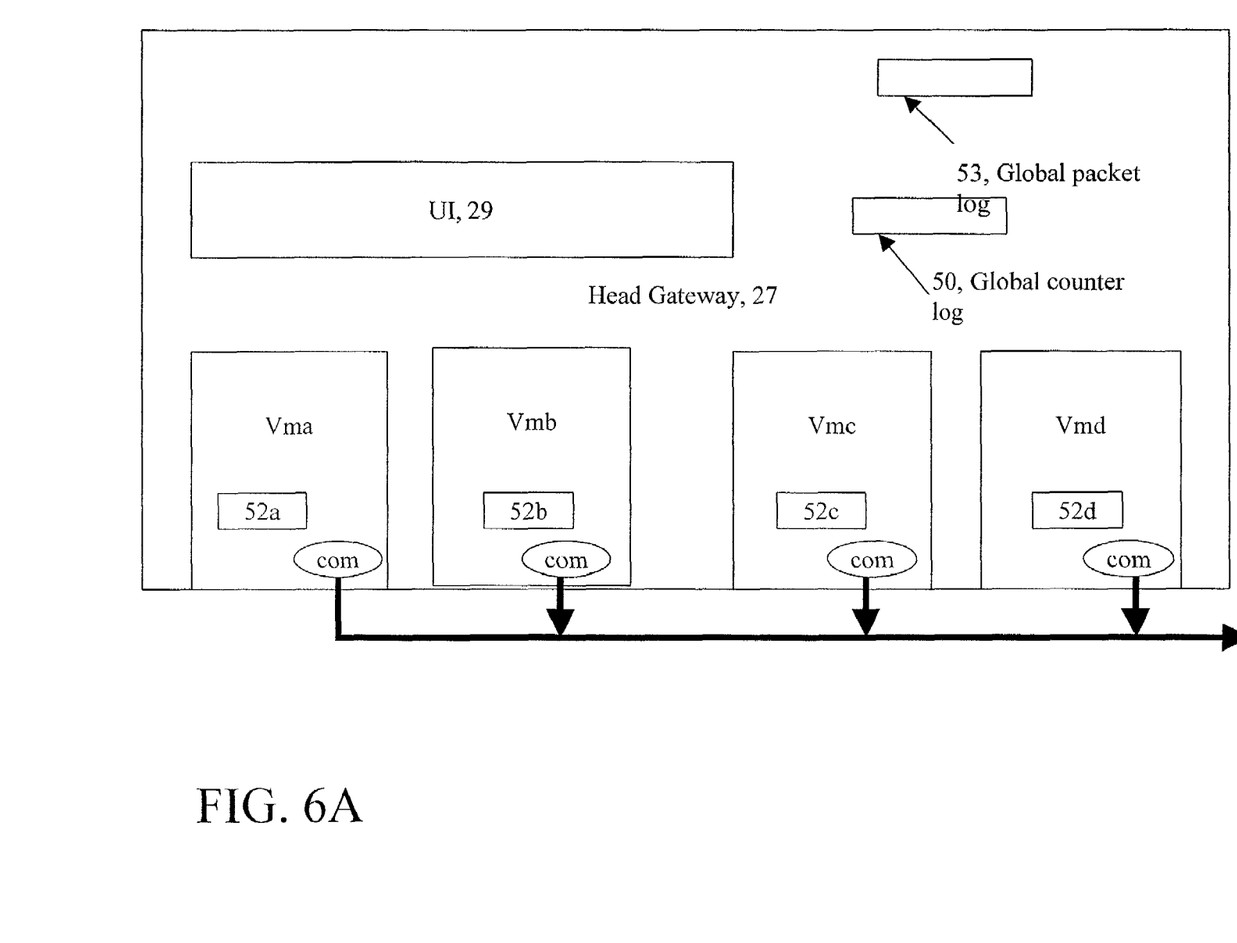
FIGS. 6A and 6B depict alternative arrangements for provisioned monitors.
Figure 6B:
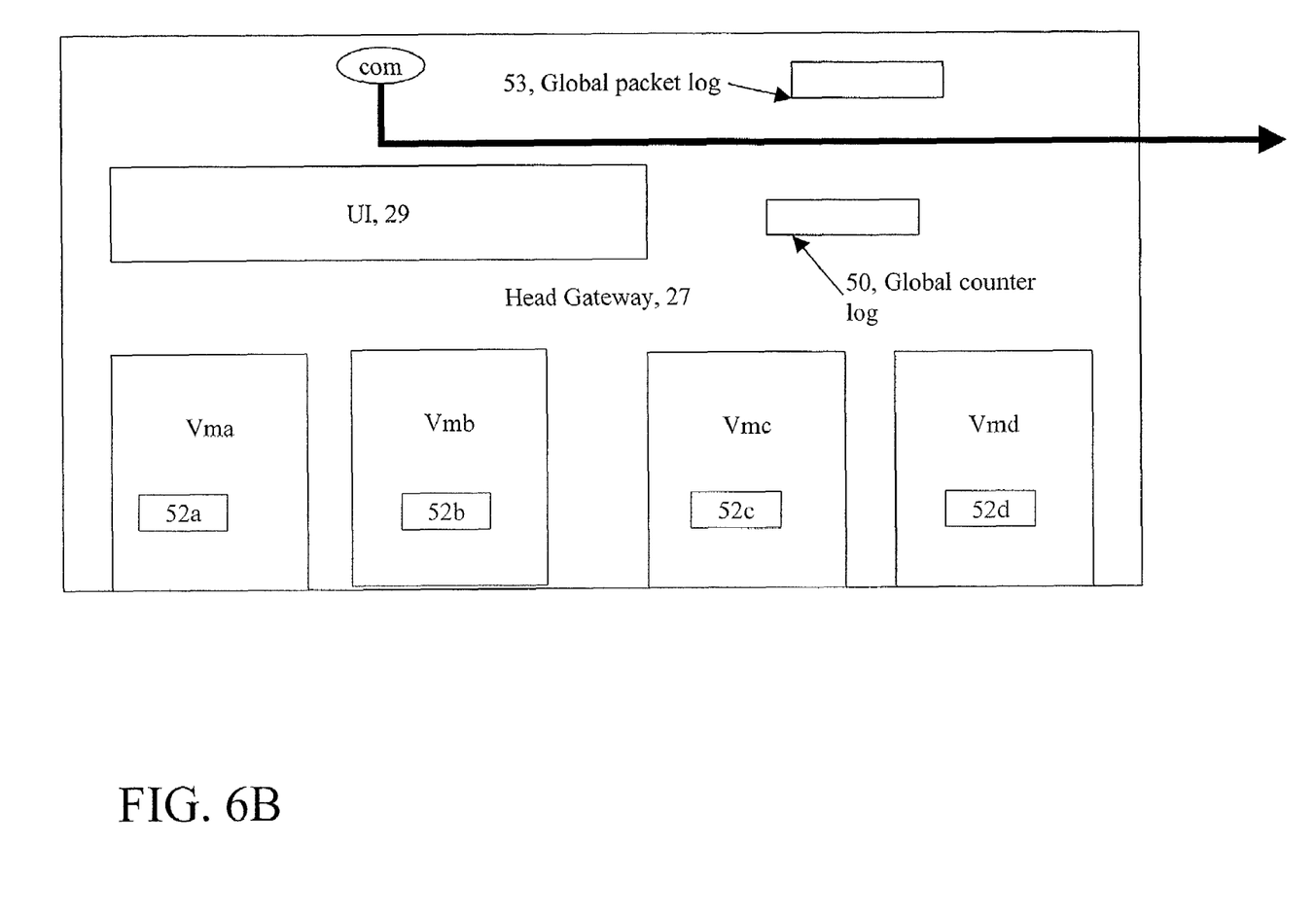

Referring to FIGS. 6A and 6B, two alternatives for a provisioned monitor (shown as a gateway 26) in a distributed approach are shown. In FIG. 6A, each of the virtual monitors 52a-52d (including the one for the physical link on which the provisioned monitor is deployed) acts as independent node in the network. In this alternative, the provisioned monitor 52a-52d can issue attack warnings and responses to attack queries independently from other virtual monitors 52a-52d in the clustered gateway 26. This approach makes virtual monitors invisible to the network, but incurs extra overhead due to multiple communication and attack query/response processes to/from a control center 24 for example. Also, it does not provide a mechanism by which the hosting provider operating the provisioned monitor can be informed of attacks to or from a particular provisioned customer. Further, if the provider that is implementing provisioned monitoring does not also implement ingress filtering on traffic entering its network from provisioned customers, then spoofing may cause a virtual monitor to incorrectly report a particular provisioned customer as the source of the attack.

In FIG. 6B, another approach has the provisioned monitor, e.g., provisioned clustered gateway 26, including all its virtual monitors 52a-52d acting as a single node in the distributed network. In this approach the provisioned monitor e.g., gateway 26 acts as an intermediary between virtual monitors 52a-52d and the rest of the network and communicates through one communication process "com". This approach makes better use of computational resources on the monitor. Only one process is required to maintain communications with control center server 24 and to reply to attack queries. When a virtual monitor detects an attack on a provisioned customer, information is conveyed both to the NOC server 24 and to the hosting provider's management interface (not shown). In this scenario, the center server 24 is adapted to distinguish an attack on a single provisioned customer (associated with a virtual monitor) from an attack on the link(s) on which the monitor is physically deployed. An alternative implementation could use a combination of the two approaches.

Figure 7A:
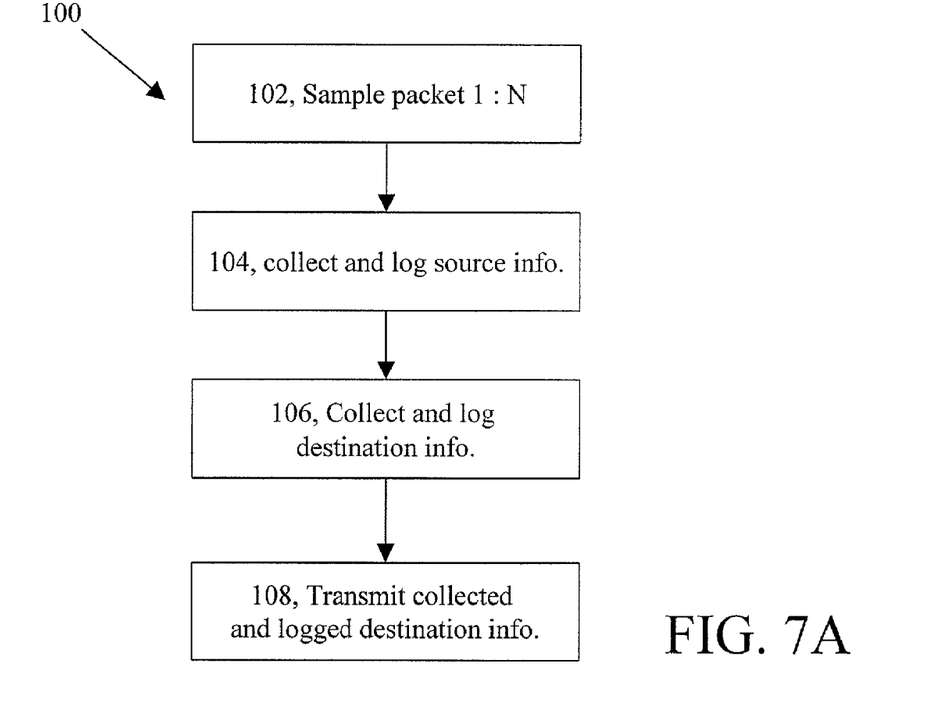
FIGS. 7A and 7B depict respectively probe and cluster head functionality.
Figure 7B:
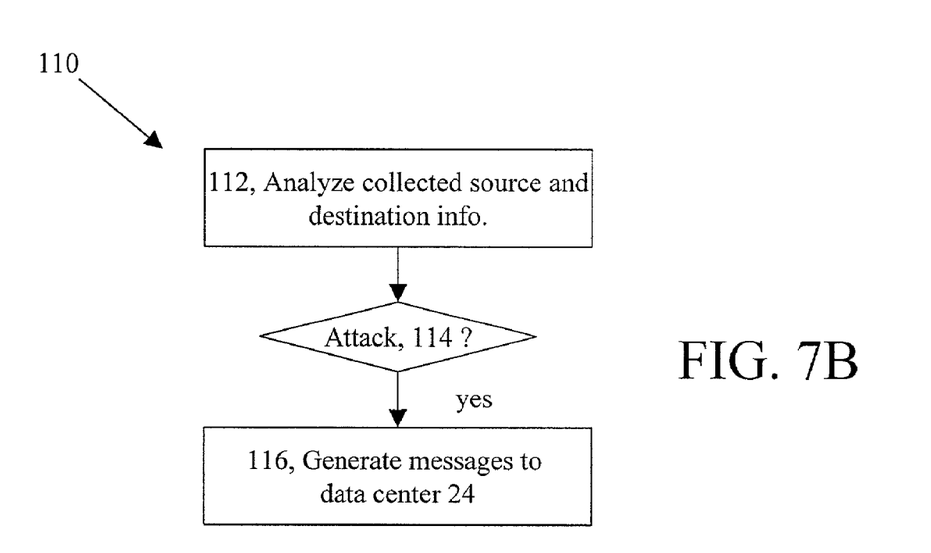

Referring now to FIGS. 7A and 7B, exemplary operational process that can occur on one or more probes 26a-26n and the cluster head 27 are shown. On the probes a process 100 (FIG. 7A) is used to sample 102 one in every N packets or to provide a random sampling of said packets. The process 100 also collects 104 and logs source information from all packets and will collect and log 106 destination information from all packets. The process 100 also collects information regarding the packet type and so forth. At respective points in time, the process 100 will transmit 108 the collected and logged destination and source information as well as other statistical information to the cluster head 27 and will likewise transmit sample packets to the cluster head 27.

Referring to FIG. 7B, a process 110 is shown that executes on the cluster head 27. The process 110 includes a process 112 to analyze collected source and destination information and to determine 114 whether or not the information corresponds to an attack on the victim center. If the information corresponds to an attack, the process 110 generates 116 a response to the attack. Exemplary responses can be to send a message to the data center 24 that an attack is underway. Optionally, a response can involve determining the nature of the attack and source of the attack at the gateway. In this option, the gateway 26 can determine corrective measures such as installing filters on nearby routers or by installing a filter in one or more of the probes 26a-26n (if the probes are in-line). These filters block undesired network traffic as will be discussed below.

The cluster head 27 makes decisions about the health of the traffic passing by the cluster 26 and keeps logs (not shown) of the traffic. To do this the cluster head 27 examines a subset of the packets flowing by the cluster members, and the counters obtained from probes 26a-26n. The cluster head 27 uses the counter information and sampled packets to determine if a cluster 26 is involved in an attack and the traffic subset will be used for logging.

With an implementation using Click, all information is contained in packets. Thus, packets are delivered from cluster probes 26a-26n to a cluster head 27. This can present a problem since the system needs to both maintain contents (including annotations) of a packet as it is transported from probe 26a-26n to head 27, and needs to distinguish different types of packets at the cluster head 27.

One specific implementation to solve these problems includes four Click elements: IPEncap, IPClassifier, PackWithAnno, and UnpackWithAnno. Also, reliable queue {Rx, Tx} is used for reliable delivery.

The traffic on the intra-cluster network would include:
NTP traffic: for time synchronization (bi-directional)
DHCP traffic: for IP address management (bi-directional)
RSH protocol a bi-directional protocol for probe traffic.
IP protocol 127: randomly sampled packets (probe to cluster head)
IP protocol 128: counter summary log packets (probe to cluster head)

The specific traffic flows can be bi-directional and are encapsulated via the PackWithAnno element on the probe and decapsulated with the UnpackeWithAnno element at the cluster head. Note that the packets are raw IP packets, i.e., the packets do not run over a user datagram or Transport UDP/TCP. With this deliver process packet size is watched carefully so as to not exceed the MTU. As exemplary parameters, the counter summary packets can be sent once per second, the TCP monitoring packets can be sent twice per report. Sampled packets are sent according to a sampling rate set for the probe. An exemplary setting is 10,000 PPS although slower or faster rates could be used. The sample packets produce the logs mentioned above. The counter summary log packets and the TCP rate monitor packets are used in attack detection heuristics. The traffic rate on the intra-cluster network should be predictable regardless of the traffic rate the cluster itself is seeing. This prevents dos attacks from loading the cluster's network. With the parameter values mentioned above the predicted traffic per probe rates: 10,000 (sample)+1 (counter summary)+2 (IP Rate monitor). The NTP and DHCP packet loads are negligible.

The gateway 26 monitoring process 74 (FIG. 4) monitors traffic that passes through the gateway and includes a communication process (not shown) that communicates statistics collected in the gateway 26 with the data center 24. The gateway 26 uses a separate interface over a private, redundant network, such as a modem 39 over the telephone network or a leased line, a network adapter over a LAN, etc. to communicate with the control center 24. Other interface types are possible. In addition, the gateway 26 can include processes (not shown) to allow an administrator to insert filters to block, i.e., discard packets that the device deems to be part of an attack, as determined by heuristics described below.

Figure 8:
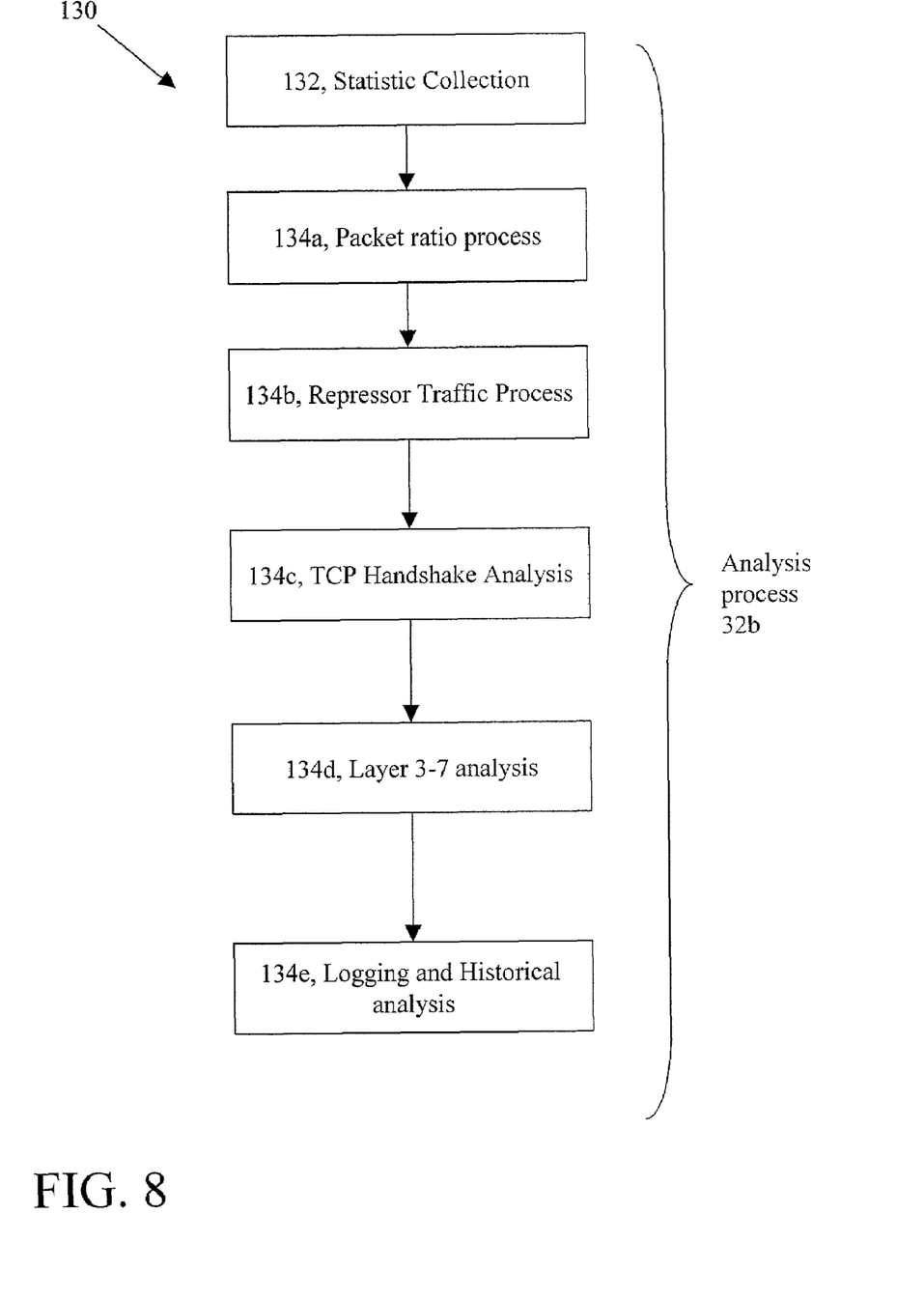
FIG. 8 is a flow chart depicting exemplary analysis processes in the cluster head.

Referring to FIG. 8, exemplary techniques 130 to determine if a data center is under attack are shown. The gateway 26 collects statistics 132 and analyzes the statistics according to one or more of the algorithms 134a-134e described below. Other algorithms can be used.

Several methods can be used separately or in combination to detect malicious traffic flows. For example, the gateway 26 can detect DoS attacks using at least one or more of the following methods including: analyzing packet ratios of TCP-like traffic; analyzing "repressor" traffic for particular types of normal traffic; performing TCP handshake analysis; performing various types of packet analysis at packet layers 3-7; and logging/historical analysis.

Packet Ratios for TCP-Like Traffic 134a.

The Transmission Control Protocol (TCP) is a protocol in which a connection between two hosts, a client C, e.g. a web browser, and a server S, e.g. a web server, involves packets traveling in both directions, between C and S and between S and C. When C sends data to S and S receives it, S replies with an ACK ("acknowledgement") packet. If C does not receive the ACK, it will eventually try to retransmit the data to S, to implement TCP's reliable delivery property. In general, a server S will acknowledge (send an ACK) for every packet or every second packet.

The monitoring process in the gateway 26 can examine a ratio of incoming to outgoing TCP packets for a particular set of machines, e.g. web servers. The monitoring process can compare the ratio to a threshold value. The monitoring process can store this ratio, time stamp it, etc. and conduct an ongoing analysis to determine over time for example how much and how often it exceeds that ratio. As the ratio grows increasingly beyond 2:1, e.g., up to about 3:1 or so, it is an increasing indication that the machines are receiving bad TCP traffic, e.g., packets that are not part of any established TCP connection, or that they are too overloaded to acknowledge the requests.

The monitoring process can monitor rates as bytes/sec and packets/sec rates of total, UDP, ICMP, and fragmented traffic in addition to TCP traffic. The thresholds are set manually by an operator. In some embodiments the device can provide a "threshold wizard" which uses historical data to help the user to set thresholds. An alternate implementation could automatically generate time-based thresholds using historical data.

Another alternate implementation could combine thresholds with a histogram analysis, and trigger traffic characterization whenever a histogram for some parameter differed significantly (by a uniformity test, or for example, by subtracting normalized histograms) from the historical histogram.

The gateway 26 divides traffic into multiple buckets, e.g. by source network address, and tracks the ratio of ingoing to outgoing traffic for each bucket. As the ratio for one bucket becomes skewed, the gateway 26 may subdivide that bucket to obtain a more detailed view. The gateway 26 raises 90 a warning or alarm to the data center 24 and/or to the administrators at the victim site 12.

Repressor Traffic 134b.

The phrase "repressor traffic" as used herein refers to any network traffic that is indicative of problems or a potential attack in a main flow of traffic. A gateway 26 may use repressor traffic analysis to identify such problems and stop or repress a corresponding attack.

One example of repressor traffic is ICMP port unreachable messages. These messages are generated by an end host when the end host receives a packet on a port that is not responding to requests. The message contains header information from the packet in question. The gateway 26 can analyze the port unreachable messages and use them to generate logs for forensic purposes or to selectively block future messages similar to the ones that caused the ICMP messages.

TCP Handshake Analysis 134c.

A TCP connection between two hosts on the network is initiated via a three-way handshake. The client, e.g. C, sends the server, e.g. S, a SYN ("synchronize") packet. S the server replies with a SYN ACK ("synchronize acknowledgment") packet. The client C replies to the SYN ACK with an ACK ("acknowledgment") packet. At this point, appropriate states to manage the connection are established on both sides.

During a TCP SYN flood attack, a server is sent many SYN packets but the attacking site never responds to the corresponding SYN ACKs with ACK packets. The resulting "half-open" connections take up state on the server and can prevent the server from opening up legitimate connections until the half-open connection expires, which usually takes 2-3 minutes. By constantly sending more SYN packets, an attacker can effectively prevent a server from serving any legitimate connection requests.

One type of attack occurs during connection setup. At setup the gateway forwards a SYN packet from the client to the server. The gateway forwards a resulting SYN ACK packet from a server to client and immediately sends ACK packet to the server, closing a three-way handshake. The gateway maintains the resulting connection for a variable timeout period. If the packet does not arrive from client to server, the gateway sends a RST ("reset") to the server to close the connection. If the ACK arrives, gateway forwards the ACK and forgets about the connection, forwarding subsequent packets for that connection. The variable timeout period can be inversely proportional to number of connections for which a first ACK packet from client has not been received. In a passive configuration, a cluster 26 can keep track of ratios of SYNs to SYN ACKs and SYN ACKs to ACKs, and raise appropriate alarms when a SYN flood attack situation occurs.

Layer 3-7 Analysis 134d.

With layer 3-7 analysis, the gateway 26 looks at various traffic properties at network packet layers 3 through 7 to identify attacks and malicious flows. These layers are often referred to as layers of the Open System Interconnection (OSI) reference model and are network, transport, session, presentation and application layers respectively. Some examples of characteristics that the gateway may look for include:

1. Unusual amounts of IP fragmentation, or fragmented IP packets with bad or overlapping fragment offsets.

2. IP packets with obviously bad source addresses, or ICMP packets with broadcast destination addresses.

3. TCP or UDP packets to unused ports.

4. TCP segments advertising unusually small window sizes, which may indicate load on server, or TCP ACK packets not belonging to a known connection.

5. Frequent reloads that are sustained at a rate higher than plausible for a human user over a persistent HTTP connection.

The monitoring process determines the rates or counts of these events. If any of the rates/counts exceeds a particular threshold, the cluster device considers this a suspicious event and begins attack characterization process.

Several attack characterization processes can be used. One type in particular uses histograms to characterize the type of attack that was detected. Co-pending U.S. patent application Ser. No. 10/066,232 Filed on Jan. 31, 2002, and entitled "DENIAL OF SERVICE ATTACKS CHARACTERIZATION", which is assigned to the assignee of the present invention and incorporated herein by reference.

Logging and Historical Traffic Analysis 134e.

The gateways 26 and data collectors 28 keep statistical summary information of traffic over different periods of time and at different levels of detail. For example, a gateway 26 may keep mean and standard deviation for a chosen set of parameters across a chosen set of time-periods. The parameters may include source and destination host or network addresses, protocols, types of packets, number of open connections or of packets sent in either direction, etc. Time periods for statistical aggregation may range from minutes to weeks. The device will have configurable thresholds and will raise warnings when one of the measured parameters exceeds the corresponding threshold.

The gateway 26 can also log packets. In addition to logging full packet streams, the gateway 26 has the capability to log only specific packets identified as part of an attack (e.g., fragmented UDP packets or TCP SYN packets that are part of a SYN flood attack). This feature of the gateway 26 enables administrators to quickly identify the important properties of the attack.

Alternatively, a gateway 26 can tap a network line without being deployed physically in line, and it can control network traffic, for example, by dynamically installing filters on nearby routers. The gateway 26 would install these filters on the appropriate routers via an out of band connection, i.e. a serial line or a dedicated network connection. Other arrangements are of course possible.

Aspects of the processes described herein can use "Click," a modular software router system developed by The Massachusetts Institute of Technology's Parallel and Distributed Operating Systems group. A Click router is an interconnected collection of modules or elements used to control a router's behavior when implemented on a computer system. Other implementations can be used.

Other embodiments are within the scope of the appended claims. For example, the provisioned monitors were described as operating on inbound traffic to thwart or protect a victim data center. Alternatively, the same approach can be used to operate on outbound traffic to attempt to stop malicious traffic from leaving a site that is involved in a denial of service attack on another site.

What is claimed is:

1. A monitoring device disposed for thwarting denial of service attacks on a data center, the monitoring device comprising:

a device, coupled to physical links between the data center and a network, with the device disposed to examine traffic entering or leaving that data center on the coupled physical links and collect statistical information on packets that are sent between the network and the data center over the coupled physical links for a plurality of customers by examining traffic as if the device was disposed on links that are downstream from the coupled links that the provisioned monitor is coupled to;

wherein the monitoring device is coupled to a control center through a dedicated, private network.

2. The monitoring device of claim 1 wherein the device further comprises:

a communication process that communications the statistical information on packets with the control center, and which receives queries or instructions from the control center.

3. The monitoring device of claim 1 wherein the monitoring device is a gateway device and further comprises:

a process to install filters to thwart denial of service attacks by removing network traffic that is deemed part of an attack.

4. The monitoring device of claim 1 wherein the monitoring device is a data collector device.

5. The monitoring device of claim 3 wherein the gateway comprises:

a process to aggregate traffic from the various links and to produce logs and detection heuristics.

6. A method of thwarting denial of service attacks on a victim data center coupled to a network comprises:
   collecting, using a provisioned monitor statistical information on packets that are sent between a network and a plurality of customers of the data center by examining traffic on selected links in the data center as if the collecting were being performed on links that are downstream from the selected links that the provisioned monitor is disposed on; and
   communicating data, over a dedicated network, to a control center.

7. The monitoring device of claim 6 wherein the device is a gateway device, which further comprises:
   installing filters to thwart denial of service attacks by removing network traffic that is deemed part of an attack.

8. The monitoring device of claim 7 wherein the monitoring device is a data collector device.

9. The monitoring device of claim 6 wherein collecting occurs for inbound and/or outbound traffic.

10. An arrangement disposed to monitor a link between a data center and a network for thwarting denial of service attacks on the data center, the arrangement comprising:
   a provisioned monitor, placed on selected links in the data center so that the provisioned monitor examines traffic entering or leaving that data center on the selected links and collects statistical information for a plurality of provisioned customers, which are on links that are downstream from the selected link that the provisioned monitor is disposed on, the provisioned monitor maintaining separate counter logs for each provisioned customer; and
   a global counter log that accounts for all traffic seen on the link that the provisioned monitor is coupled to.

11. The arrangement of claim 10 wherein the provisioned monitor is a gateway that maintains separate packet logs for each monitor.

12. The arrangement of claim 11 wherein the gateway maintains a global packet log for all traffic.

13. The arrangement of claim 12 wherein the global packet log includes a sample of all traffic seen on the link to which the gateway is connected.

14. The arrangement of claim 13 wherein packet analysis for a particular monitor happens by classifying packets based on addresses at the time of the analysis.

15. The arrangement of claim 12 wherein the gateway maintains duplicate packets, keeping both a global packet log and a packet log for each monitor.

16. The arrangement of claim 11 wherein the gateway is a clustered gateway and includes a plurality of probes and a cluster head, with the cluster head having a process to aggregate traffic from the probes and to produce separate counter logs for each provisioned customer; and a global counter log, and produce detection heuristics.

17. The arrangement of claim 10 wherein the provisioned monitor including a virtual monitor for the physical link on which the provisioned monitor is deployed is configured to be an independent node in the network capable of issuing attack warnings and responses to attack queries independently from other virtual monitors of the provisioned monitor.

18. The arrangement of claim 17 wherein the provisioned monitor including all of the provisioned monitor's virtual monitors act as one node in the distributed network.

19. The arrangement of claim 18 wherein the provisioned monitor acts as an intermediary between virtual monitors and the rest of the network and includes a process to maintain communications with the control center and to reply to attack queries.

20. The arrangement of claim 17 wherein the provisioned monitor's virtual monitors have filters installed on a per virtual monitor basis.

21. The arrangement of claim 17 wherein when a virtual monitor detects an attack on a provisioned customer, information is conveyed both to the control center and to a hosting provider's management interface.

22. The arrangement of claim 21 wherein the control center is adapted to distinguish an attack on a single provisioned customer associated with a virtual monitor and an attack on the link(s) on which the monitor is physically deployed.

23. A method of thwarting attacks on a victim data center coupled to a network comprises:
   collecting statistical information for a plurality of provisioned customers on links that are downstream from links on which collecting occurs; and
   maintaining separate counter logs for each provisioned customer; and a global counter log that accounts for all traffic seen on the links on which collecting occurs.

24. The method of claim 23 wherein collecting occurs on a gateway that passes network packets, the gateway being disposed at an edge of the network.

25. The method of claim 23 wherein collecting occurs on a data collector that samples network packets, the data collector being disposed at a location that is at a large aggregation link in the network for the data center.

26. The method of claim 23 further comprising:
   performing, by the provisioned gateway, intelligent traffic analysis and filtering to identify the malicious traffic and to eliminate the malicious traffic.

27. A method of thwarting attacks on a victim data center coupled to a network comprises:
   collecting statistical information for a plurality of links that are downstream from links on which collecting occurs;
   performing traffic analysis on the collected statistical information on a per downstream link basis to identify malicious traffic; and
   communicating alerts that arise from the traffic analysis;
   wherein the collected statistical information is communicated to a control center through a dedicated, private network to facilitate the traffic analysis.

28. The method of claim 26 wherein performing analysis occurs on statistical information collected for an individual one of the downstream links to identify malicious traffic intended for the individual one of the downstream links.

29. The method of claim 26 wherein communicating to a control center occurs on a downstream link basis.

30. The method of claim 26 wherein communicating occurs on a downstream link basis to a control center that determines a response to the attack.

31. The method of claim 26 wherein communicating occurs on a downstream link basis over a dedicated, hardened network to a control center that determines a response to the attack.

32. The method of claim 26 further comprising:
   filtering the identified malicious traffic and to eliminate the malicious traffic from reaching the one of the downstream links.

* * * * *

UNITED STATES PATENT AND TRADEMARK OFFICE
CERTIFICATE OF CORRECTION

PATENT NO. : 7,657,934 B2  Page 1 of 1
APPLICATION NO. : 10/066252
DATED : February 2, 2010
INVENTOR(S) : Massimiliano Antonio Poletto et al.

It is certified that error appears in the above-identified patent and that said Letters Patent is hereby corrected as shown below:

In claim 2 (at column 10, line 53), please replace the word "communications" with the word --communicates--.

In claim 10 (at column 11, line 29), please replace the word "link" with the word --links--.

In claim 28 (at column 12, line 47), replace the number "26" with --27-- so that the line starts: "The method of claim 27".

In claim 29 (at column 12, line 51), replace the number "26" with --27-- so that the line starts: "The method of claim 27".

In claim 30 (at column 12, line 53), replace the number "26" with --27-- so that the line starts: "The method of claim 27".

In claim 31 (at column 12, line 56), replace the number "26" with --27-- so that the line starts: "The method of claim 27".

In claim 32 (at column 12, line 60), replace the number "26" with --27-- so that the line starts: "The method of claim 27".

Signed and Sealed this

Twenty-seventh Day of April, 2010

David J. Kappos
*Director of the United States Patent and Trademark Office*

UNITED STATES PATENT AND TRADEMARK OFFICE
CERTIFICATE OF CORRECTION

PATENT NO. : 7,657,934 B2
APPLICATION NO. : 10/066252
DATED : February 2, 2010
INVENTOR(S) : Poletto et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 2332 days.

Signed and Sealed this

Twenty-eighth Day of December, 2010

David J. Kappos
*Director of the United States Patent and Trademark Office*